United States Patent
Wick et al.

(10) Patent No.: US 9,071,833 B1
(45) Date of Patent: Jun. 30, 2015

(54) TWO-DIMENSIONAL SUPPLEMENTARY INFORMATION IN A THREE-DIMENSIONAL IMAGE

(75) Inventors: Ryan Alan Wick, Apollo Beach, FL (US); Raymond Emilio Reeves, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 409 days.

(21) Appl. No.: 13/545,379

(22) Filed: Jul. 10, 2012

(51) Int. Cl.
*H04N 13/00* (2006.01)
*H04N 9/47* (2006.01)
*H04N 9/80* (2006.01)
*H04N 13/04* (2006.01)

(52) U.S. Cl.
CPC ....... *H04N 13/0404* (2013.01); *H04N 13/0055* (2013.01)

(58) Field of Classification Search
None
See application file for complete search history.

(56) References Cited

U.S. PATENT DOCUMENTS

| | | | |
|---|---|---|---|
| 8,054,329 B2 | 11/2011 | Shestak et al. | |
| 8,723,927 B2 * | 5/2014 | Rosen | 348/51 |
| 2006/0227420 A1 | 10/2006 | Cha et al. | |
| 2007/0008619 A1 | 1/2007 | Cha et al. | |
| 2011/0248988 A1 | 10/2011 | Park et al. | |
| 2012/0280899 A1* | 11/2012 | Huhtala et al. | 345/156 |
| 2013/0222394 A1* | 8/2013 | Fyke | 345/467 |

* cited by examiner

*Primary Examiner* — Heather Jones

(57) ABSTRACT

What is disclosed is an apparatus, method, and system for integrating supplemental information into one image of a three-dimensional image such that the integrated information is generally more clearly visible when viewing the three-dimensional image with only one eye.

19 Claims, 5 Drawing Sheets

TWO-DIMENSIONAL SUPPLEMENTARY INFORMATION IN A THREE-DIMENSIONAL IMAGE

TECHNICAL FIELD

Aspects of the disclosure are related to the field of data display, and in particular, integrating supplementary information in one of two within a three-dimensional image.

TECHNICAL BACKGROUND

Visual data is being displayed more and more in wireless communication devices and other devices. Three-dimensional displays are becoming more popular. One method of displaying three-dimensional data includes using glasses to allow a user to view three-dimensional data from a two-dimensional display device.

More recent two-dimensional displays use a filter, such as a parallax barrier or lenticular lenses on or near the display so that glasses are not needed to view three-dimensional data on a generally two-dimensional display device. The three-dimensional image may be made up of two, interleaved, two-dimensional images. The filter blocks one of the two-dimensional images from being viewed by one eye, and the filter blocks the other of the two, two-dimensional images from the other eye.

These filters allow for viewing of three-dimensional content if the user views the display at a certain distance and angle, and with both eyes open. Each eye will see a different set of pixels from the three-dimensional image because of the filter and/or the viewer's brain may put the two or more images together to create a three-dimensional experience.

If a user views the data with one eye, the image may be somewhat clear, but of lower resolution than if viewed with two eyes. If a user views the data without a filter, or at a suboptimal angle or distance, the data may seem blurry.

OVERVIEW

Systems, methods, and software for integrating supplementary information in one of two images within a three-dimensional image, where the integrated information is generally more clearly visible when viewing the three-dimensional image with only one eye. Information such as movie length, or notifications may be integrated within a three-dimensional image, such that when a user closes one eye, the supplementary information becomes more visible. In this manner, a user may be able to view the supplementary information without disrupting viewing of the three-dimensional image.

DETAILED DESCRIPTION

Figure 1:
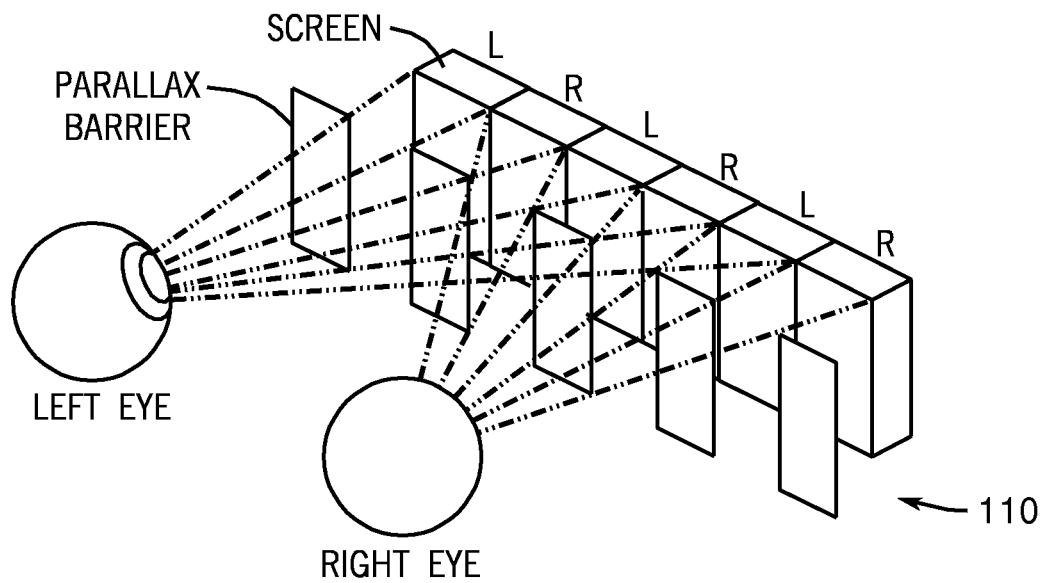
FIG. 1 illustrates a system with parallax barrier and lenticular lens filter.
Figure 1:
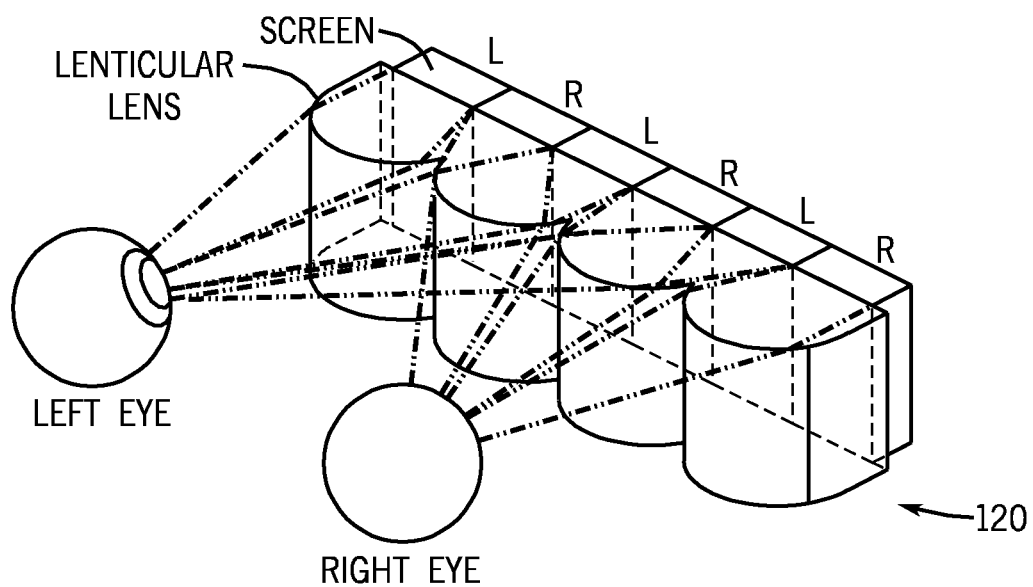

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

As will be appreciated from the drawings, three-dimensional imagery can be achieved through the use of a combination of two-dimensional images viewed through a parallax barrier, and/or lenticular lens. Portions of the combined image may be filtered such that only a portion of the total image is viewed by each eye of a user. When a user closes one eye, only one of the two-dimensional images may be seen, and the image may not appear to be three-dimensional.

Supplemental information, such as alerts, notifications, and/or textual information may be integrated in one of the two-dimensional images. When the user views the combined image with both eyes, they may not be able to perceive the supplemental information as it is only in one of the images. When the appropriate eye is closed the supplemental information may become clearer to the user.

Color blending and/or information cancelling may be used in the two-dimensional image without the supplemental information, and the two-dimensional image with the supplemental information, to decrease the visibility of the supplemental information when the combined image is viewed with both eyes. This may make the supplemental information generally invisible, or generally not noticeable, to the user.

In another example, an eye sensor adjacent the display device may detect when a user has only one eye open, and integrate the supplemental information into the appropriate two-dimensional image when this is detected. Color blending and information cancelling may not be needed in this example.

Figure 2:
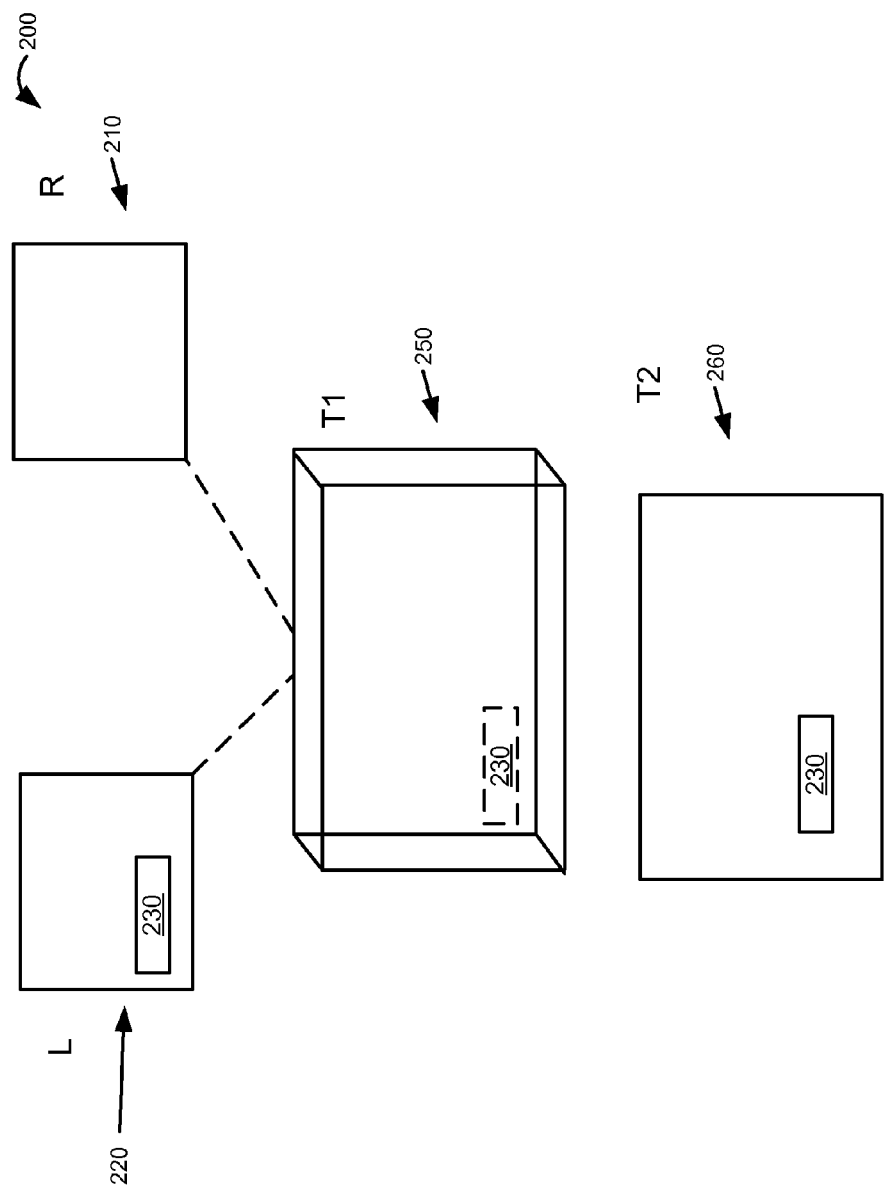
FIG. 2 illustrates two images being combined to form a three-dimensional image.
Figure 3:
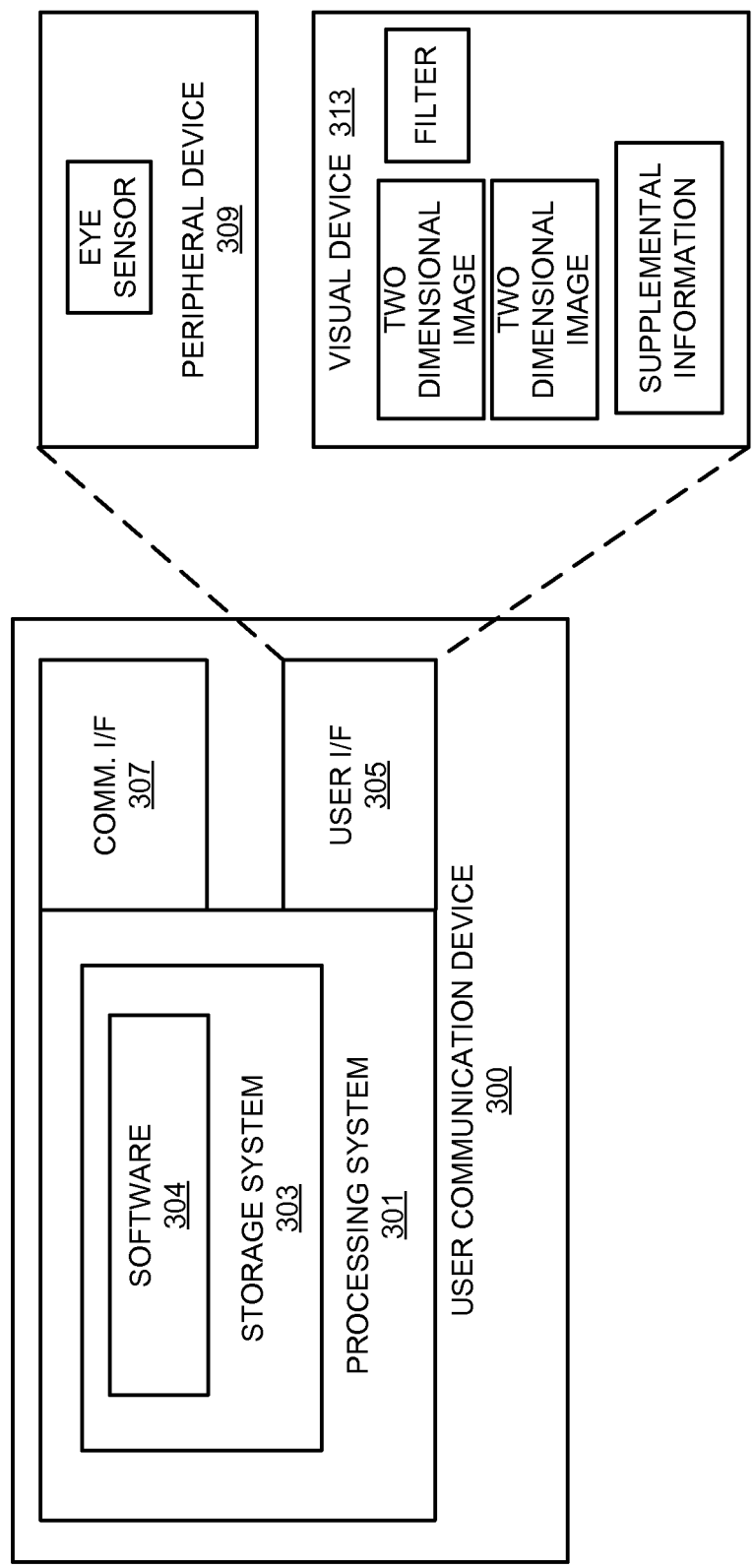
FIG. 3 illustrates a device capable of displaying a two-dimensional images being combined to form a three-dimensional image.
Figure 4:
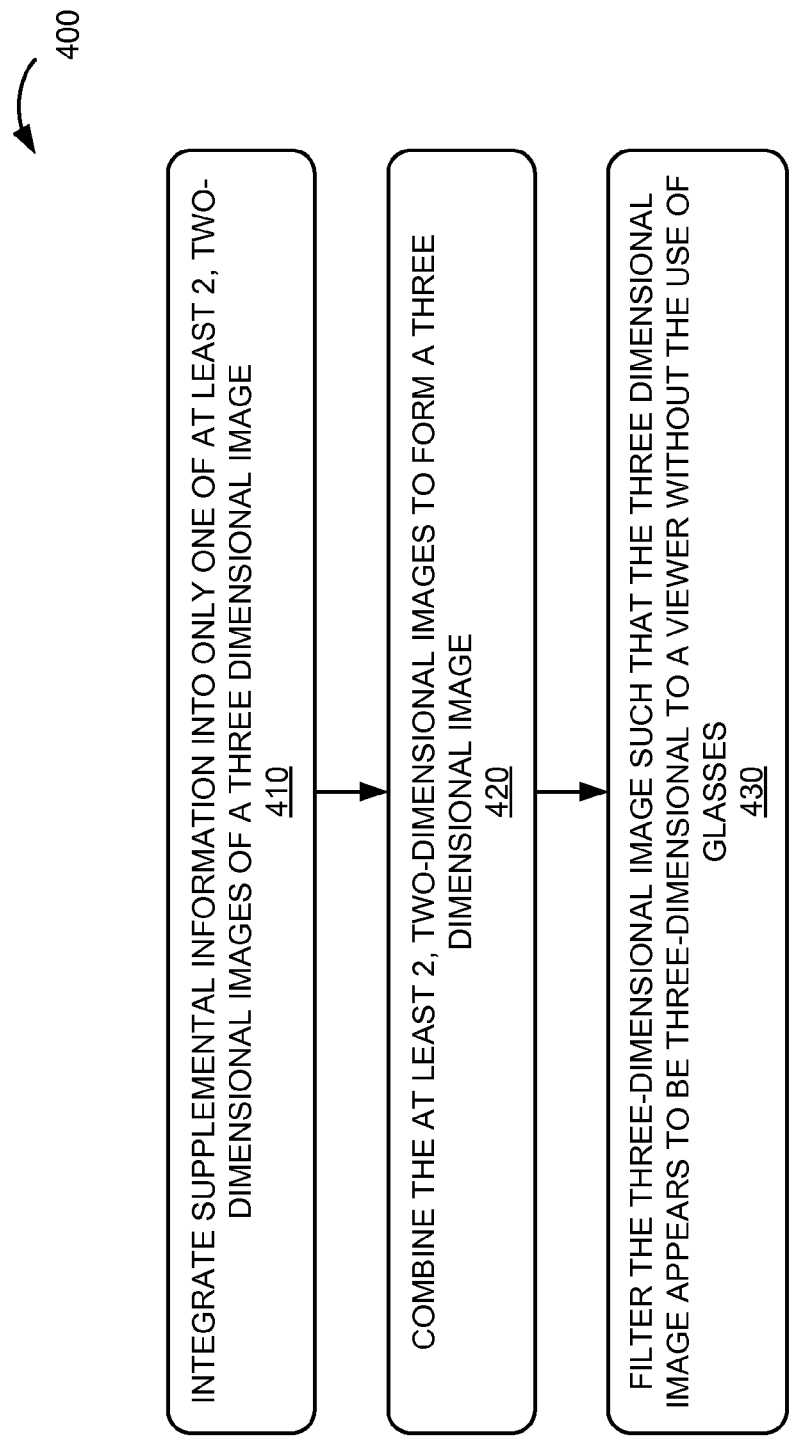
FIG. 4 illustrates a method of integrating supplemental information in a three-dimensional image.
Figure 5:
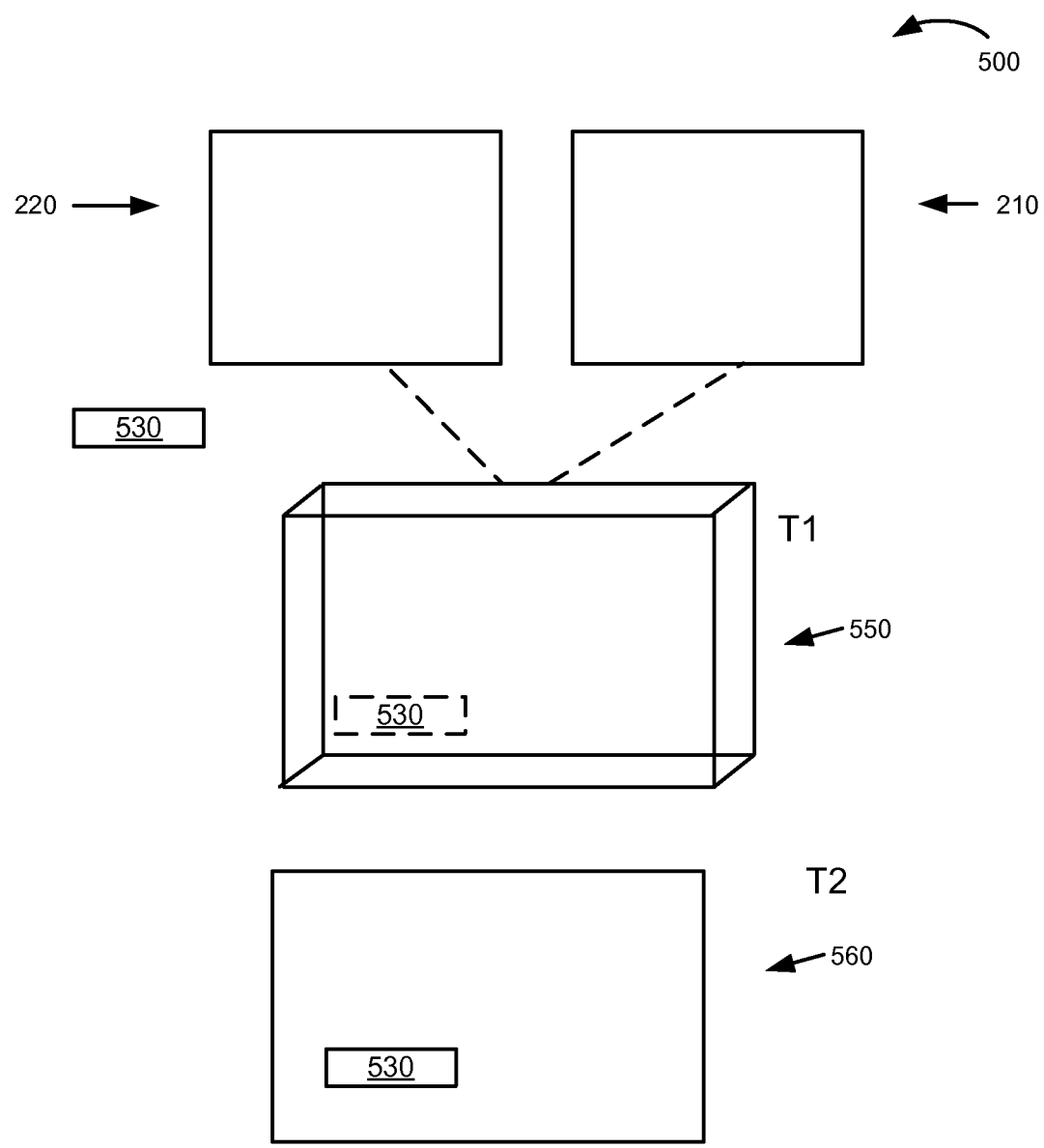
FIG. 5 illustrates three images being combined to form a three-dimensional image.

Referring now to the drawings, FIG. 1 illustrates a system with parallax barrier or lenticular lenses. FIG. 2 illustrates two, two-dimensional images being combined to form a three-dimensional image. FIG. 3 illustrates an electronic device capable of displaying a two-dimensional images being combined to form a three-dimensional image. FIG. 4 illustrates method of integrating supplemental information in a three-dimensional image. FIG. 5 illustrates 3, two-dimensional images being combined to form a three-dimensional image.

The introduction of parallax barriers and lenticular lenses on or near display devices allows for viewing of three-dimensional content without the use of three-dimensional glasses. These filters allow for viewing of three-dimensional content if the user views the display at a certain distance and angle, and with both eyes open. Each eye will see a different set of pixels from the three-dimensional image because of the filter and/or the viewer's brain may put the two or more images together to create the three-dimensional experience.

FIG. 1 illustrates examples of filters which may be used to make two, two-dimensional image appear three-dimensional to a user when both eyes are open. A parallax barrier 110 may be used to block certain pixels when viewed with both eyes. A two-dimensional image is formed generally with every other column, such as columns 1, 3, 5, etc. Another two-dimensional image can also be formed with every other column, such as columns 2, 4, 6, etc. The images can then be combined to form one image. This combined image, along with a filter, may appear to be three-dimensional if viewed at a certain distance and angle, and with both eyes open.

A parallax barrier is a device placed in front of an image source, such as a liquid crystal display, to allow it to show a stereoscopic image or multiscopic image without the need for the viewer to wear three-dimensional glasses. Placed in front of the normal liquid crystal display, it consists of a layer of material with a series of precision slits, allowing each eye to see a different set of pixels, so creating a sense of depth through parallax.

A lenticular lens is an array of magnifying lenses, designed so that when viewed from slightly different angles, different images are magnified. Each eye sees only one image. The user's brain puts the images together and the user interprets it as a three-dimensional image.

A lenticular lens filter 120 may operate in a similar manner. The two-dimensional images may be formed and combined in the same way. Filter 120 may magnify different pixel columns, such that different two-dimensional images are viewed by a user with each eye. When viewed with both eyes, the image may appear to be three-dimensional to the user.

FIG. 2 illustrates an operational scenraio 200 for combining two, two-dimensional images 210, and 220, and supplemental information 230 to form a three-dimensional image 250 and 260. Image 210 may generally be referred to as the "left" image, and image 210 may be generally referred to as the "right" image.

As discussed above, the two-dimensional images 210 and 220 may be interleaved/combined into a three-dimensional image 250. When combined with a filter (110 and/or 120 from FIG. 1), the image may appear to be three-dimensional to a user.

Supplemental information 230 may be integrated into one of the images, in this non-limiting example, the left image 220. When the combined image 250 is viewed at a time T1 by a user with both eyes open, image 250 will appear to be three-dimensional and supplementary information 230 may not be able to be perceived clearly by the user because the supplemental information is only visible by one eye.

However, when the user closes one eye, in this example the right eye, and views the image 260 at time T2, image 260 will appear two-dimensional and supplemental information 230 may be much more clear and readable. It will be appreciated that supplemental information 230 may be added to either or both images 210, 220 at various locations within the images 210, 220.

The area with supplemental information 230 may be blurry, or a portion of the supplemental information 230 may be partially viewable by the user when viewing image 250 with both eyes. Image blending and/or cancellation may be used to make the supplemental information 230 less or not visible at all to the user.

In another example, supplemental information 230 may only be displayed when it is determined a user has only one eye open. The display device, or other device may include an eye sensor, which is capable of sensing when the user has only one eye open, and which eye is open. The supplemental information 230 may then be displayed in the appropriate image such that the supplemental information 230 is generally more clearly visible to the user. Again the combined image will appear two-dimensional.

Supplemental information 230 may be, but is not limited to, information about the image being viewed, such as an indication of the amount of time remaining in the movie being displayed. Supplemental information 230 may also be notifications, such as a notification of new email received on the device. Supplemental information 230 may also be another image or movie, similar to picture-in-picture type display. It will be appreciated that supplemental information 230 may be any type of information capable of being viewed, displayed and/or communicated.

FIG. 3 illustrates an example of a communication device 300 capable of integrating supplemental information into a three-dimensional image. Communication device 300 may also be a system or other device, such as a television, computer apparatus, or any other device capable of displaying information. Communication device 300 includes processing system 301, storage system 303, software 304, user interface 305, and communication interface 307. It should be understood that some elements could be omitted. Processing system 301 is linked to storage system 303, user interface 305, and communication interface 307. Storage system 303 stores software 304, executable in operation by processing system 301.

Communication interface 307 comprises a network card, network interface, port, or interface circuitry that allows communication device 300 to communicate with other communication devices over a variety of networks. Communication interface 307 may also include a memory device, software, processing circuitry, or some other device. Communication interface 307 may use various communication protocols, such as time division multiplex, internet, Ethernet, wireless, or some other communication format—including combinations thereof—to exchange communications as described herein for communication devices.

Data may be communicated to and from the device 300 via communication interface 307. The communicated data may include movies, images, telephone calls, text messages, notifications, and many other types of data. Cellular communications, streaming and downloading techniques and systems may accomplish this communication.

User interface 305 comprises components that interact with a user to receive user inputs and user communications and to present media and/or information. User interface 305 may include a speaker, microphone, buttons, lights, display screen, mouse, keyboard, or some other user input/output apparatus—including combinations thereof.

In this embodiment, user interface 305 includes a peripheral device 309 and a visual device 313. Peripheral device 309 could be any device that can receive or output user communications, such as a keyboard, mouse, or other such device. In this example peripheral device 309 includes an eye sensor, which is capable of determining when a user has both eyes open, and/or only one eye open, and which eye is closed.

Visual device 313 may include any device capable of displaying images to a user, including multiple two-dimensional images 210, 220, supplemental information 230, and/or three-dimensional images 250, 260, among other images and information. An example of a visual device 313 is a display screen.

Visual device 313 also includes an adjacent filter 110, 120 (FIG. 1), which may assist a user in viewing three-dimensional images displayed by visual device 313. It will be appreciated that filter 110, 120 may be in any position which allows for the user to perceive a three-dimensional image from visual device 313.

Processing system 301 may comprise a microprocessor and other circuitry that retrieves and executes software 304 from storage system 303. Storage system 303 comprises a disk drive, flash drive, data storage circuitry, or some other memory apparatus. Processing system 301 is typically mounted on a circuit board that may also hold storage system 303 and portions of communication interface 307 and user interface 305.

It will be appreciated that although a communication device, such as a cellular telephone is disclosed, any device or system capable of displaying supplemental information in a three-dimensional image are encompassed by this disclosure and claims. These devices include, but are not limited to, televisions and computers and other displays.

Software 304 comprises computer programs, firmware, or some other form of machine-readable processing instructions. Software 304 may include an operating system, utilities, drivers, network interfaces, applications, virtual machines, or some other type of software. When executed by processing system 301, software 304 directs processing system 301 to operate communication device 300 to perform as described herein for communication devices.

It will be appreciated that communication device may be coupled to a wireless network and the images may b a movie downloaded or streamed for viewing. If so, then the supplemental information may be known statistics about the movie, such as time remaining, etc. In this example, communication device 300 may also receive emails, texts, etc. from the wireless network. The supplemental information may include alerts and notifications.

Furthermore, the integration of images and supplemental information may occur before the information reaches communication device 300, and/or in the hardware and software of the device. The software/hardware may include a graphics platform and/or programs capable of integrating the images and the supplemental information. Furthermore, the hardware may include a three-dimensional media player, and/or any other hardware/software/firmware capable of combining/integrating the images and the supplemental information. It will be appreciated that portions of the integrating may be performed, whole or in part, by the various hardware, software and/or firmware in the systems described or implied herein.

FIG. 4 illustrates a flow diagram illustrating a method 400 of operation of wireless communication device 300. Method 400 includes integrating supplemental information into only one of at least two, two-dimensional images of a three-dimensional image at 410. As noted above, this may include adding the supplemental information 230 into one of two, two-dimensional images, and/or combining a third two-dimensional image with the supplemental information with at least two, two-dimensional images.

Method 400 includes combining the at least two, two-dimensional images to form a three-dimensional image at 420. These images may be combined/integrated in any manner suitable for this purpose. Method 400 includes filtering the three-dimensional image such that the three-dimensional image appears to be three-dimensional to a viewer without the use of glasses. This may be accomplished by using a parallax barrier 110, lenticular lens 120, or any other filer suitable for this purpose.

Method 400 is accomplished such that the supplemental information is generally not identifiable when the three-dimensional image is viewed by two eyes, and the supplemental information is generally more clearly visible when viewed by only one eye of a user.

Method 400 may also include determining if the user has only one eye open, and determining which eye the user has open (not shown). Method 400 may then include integrating the supplemental information 230 into the appropriate image 210, 220 such that the supplemental information 230 is generally more clearly perceivable by the user.

FIG. 5 illustrates three, two-dimensional images used to form a three-dimensional image with supplemental information. Two-dimensional images 210 and 220 are similar or the same as the images from FIG. 2. In this non-limiting example, supplemental information 530 is in the form of a third two-dimensional image. The three, two-dimensional images are integrated and/or combined, along with a filter 110, 120, to form a perceivable three-dimensional image.

Supplemental information 530 may be overlaid, integrated and/or combined with one or more two-dimensional images, in this non-limiting example, left image 220. When the combined image 550 is viewed by a user at a time T1 with both eyes open, combined image 550 will appear three dimensional, and supplementary information 530 may not be able to be perceived clearly by the user because the supplemental information is only viewed by one eye.

However, when the user closes one eye, in this example the right eye, and views the combined image 560 at time T2, combined image 560 will appear two-dimensional, and supplemental information 530 may be much more clear and perceivable. It will be appreciated that supplemental information 530 may be overlaid, added, combined, and/or integrated to either, or both images 210, 220 at various locations within the images.

As in the example in FIG. 2, the area with supplemental information 530 may be blurry, or a portion of the supplemental information 530 may be partially viewable by the user when viewing image 550 with both eyes. Image blending and/or cancellation may be used to make the supplemental information 530 less or not visible at all to the user.

Using these systems and methods more information may be viewable by a user. Supplemental information may be integrated into a three-dimensional image such that when a user closes one eye, the supplemental information may be more clearly visible.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a communication device, comprising:
   integrating supplemental information into only one of at least two images of a three-dimensional image;
   combining the at least two images to form a three-dimensional image; and
   displaying the three-dimensional image via a display device, where the supplemental information is generally not identifiable when the three-dimensional image is viewed by two eyes, and wherein the supplemental information is generally more clearly visible when viewed by only one eye.

2. The method of claim 1, further comprising determining if a user has only one eye open, and wherein the integrating is accomplished upon determination that the user has only one eye open.

3. The method of claim 1, further comprising blending of colors in the general area of the integrated supplemental information in the other of the at least two images to cause the supplemental information to be less visible when the three-dimensional image is viewed with both eyes.

4. The method of claim 1, further comprising using image cancelling in the general area of the integrated supplemental information in the other of the at least two images to cause the supplemental information to be less visible when the three-dimensional image is viewed with both eyes.

5. The method of claim 1, further comprising filtering, with a filter, the three-dimensional image such that the three-dimensional image appears to be three-dimensional to a viewer without the use of glasses.

6. The method of claim 5, wherein the filter comprises a parallax barrier and/or a lenticular lens.

7. The method of claim 1, wherein the supplemental information comprises a notification and/or textual information.

8. The method of claim 1, wherein the supplemental information comprises supplemental information as a third image, and the integrating the supplemental information comprises combining the supplemental information and the at least two images.

9. A computer apparatus comprising:
   user interface software that when executed by a processor directs the computer apparatus to determine if a user has only one eye open;
   integration software to direct the processor to integrate supplemental information into only one of at least two images of a three-dimensional image, if it is determined that user has only one eye open; and
   display software to direct the processor to combine the at least two images to form a three-dimensional image, where the supplemental information is generally not identifiable when the three-dimensional image is viewed by two eyes, and wherein the supplemental information is generally more clearly displayed when a user had only one eye open; and
   a non-transitory computer readable storage medium having the user interface software, the integration, and the display software stored thereon.

10. The computer apparatus of claim 9, wherein the display software further comprises instructions to direct the processor to blend colors in at least a portion of the three-dimensional image in the general area of the integrated supplemental information to cause the supplemental information to be less visible when the three-dimensional image is viewed with both eyes.

11. The computer apparatus of claim 9, wherein the display software further comprises instructions to direct the processor to use image cancelling in the general area of the integrated supplemental information in the three-dimensional image in the general area of the supplemental information to cause the supplemental information to be less visible when the three-dimensional image is viewed with both eyes.

12. The computer apparatus of claim 9, further comprising a filter configured to filter the three-dimensional image such that the three-dimensional image appears to be three-dimensional to a viewer without the use of glasses.

13. The computer apparatus of claim 12, wherein the filter comprises a parallax barrier and/or a lenticular lens.

14. The computer apparatus of claim 9, wherein the supplemental information comprises a notification and/or textual information.

15. The computer apparatus of claim 9, wherein the supplemental information comprises supplemental information as a third image, and the integrating the supplemental information comprises combining the supplemental information and the at least two images.

16. A wireless communication device having a plurality of applications available for use by a user, the wireless communication device comprising:
   a processing system configured to integrate supplemental information into only one of at least two images of a three-dimensional image, and combine the at least two images to form a three-dimensional image, where the supplemental information is generally not identifiable when the three-dimensional image is viewed by two eyes, and wherein the supplemental information is generally more clearly visible when viewed by only one eye; and
   a display configured to present to the user the three-dimensional image and the supplementary information.

17. The wireless communication device of claim 16, wherein the processing system is further configured to blend of colors in at least a portion of the three-dimensional image in the general area of the integrated supplemental information to cause the supplemental information to be less visible when the three-dimensional image is viewed with both eyes.

18. The wireless communication device of claim 16, further comprising a filter configured to filter the three-dimensional image such that the three-dimensional image appears to be three-dimensional to a viewer without the use of glasses.

19. The wireless communication device of claim 18, wherein the filter comprises a parallax barrier and/or a lenticular lens.

* * * * *